United States Patent
Tasque et al.

(10) Patent No.: US 11,787,909 B2
(45) Date of Patent: Oct. 17, 2023

(54) HYDROGELS DERIVED FROM ACRYLAMIDE FOR CONTROLLING CIRCULATION LOSSES AND METHODS OF FABRICATION THEREOF

(71) Applicants: YPF TECNOLOGÍA S.A., Ciudad Autónoma de Buenos Aires (AR); UNIVERSIDAD DE BUENOS AIRES, Ciudad Autónoma de Buenos (AR); CONSEJO NACIONAL DE INVESTIGACIONES CIENTÍFICAS Y TÉCNICAS (CONICET), Ciudad Autónoma de Buenos Aires (AR)

(72) Inventors: Joana Elisa Tasque, San Martín—Buenos Aires (AR); Pablo Alejandro Raffo, Ciudad Autónoma de Buenos Aires (AR); Isabel Natalia Vega, La Plata Provincia de Buenos Aires (AR); Norma Beatriz D'Accorso, Ciudad Autónoma de Buenos Aires (AR); Darío Alberto Contrera, Mendoza—Provincia de Mendoza (AR)

(73) Assignees: YPF TECNOLOGIA S.A., Ciudad Autonoma de Buenos Aires (AR); UNIVERSIDAD DE BUENOS AIRES, Ciudad Autonoma de Buenos Aires (AR); CONSEJO NACIONAL DE INVESTIGACIONES CIENTIFICAS Y TECNICAS (CONICET)., Ciudad Autonoma de Buenos Aires (AR)

( * ) Notice: Subject to any disclaimer, the term of this patent is extended or adjusted under 35 U.S.C. 154(b) by 0 days.

(21) Appl. No.: 16/725,124

(22) Filed: Dec. 23, 2019

(65) Prior Publication Data
US 2020/0207927 A1 Jul. 2, 2020

(30) Foreign Application Priority Data
Dec. 26, 2018 (AR) .............................. 20180103859

(51) Int. Cl.
*C09K 8/56* (2006.01)
*C08J 3/075* (2006.01)
*C08F 20/56* (2006.01)
*C09K 8/512* (2006.01)

(52) U.S. Cl.
CPC ............... *C08J 3/075* (2013.01); *C08F 20/56* (2013.01); *C09K 8/512* (2013.01); *C08F 2810/20* (2013.01); *C08J 2333/26* (2013.01)

(58) Field of Classification Search
CPC ........ C08J 3/075; C08J 2333/26; C08F 20/56; C08F 2810/20; C08F 220/54; C08F 220/56; C09K 8/512; C09K 8/5083; C09K 8/5086; C09K 8/03; C09K 2208/10
See application file for complete search history.

(56) References Cited

U.S. PATENT DOCUMENTS

| 6,066,172 A | 5/2000 | Huo et al. |
| 2011/0009520 A1* | 1/2011 | Figuly ................... A61L 27/52 523/113 |
| 2015/0027710 A1 | 1/2015 | Miller |

FOREIGN PATENT DOCUMENTS

| CN | 103408777 | * 11/2013 | |
| CN | 103409119 | * 11/2013 | |
| EP | 0583814 A1 | 2/1994 | |
| JP | 3541894 B2 | * 7/2004 | ............ C08F 220/54 |
| WO | WO2016171683 A1 | 10/2016 | |

OTHER PUBLICATIONS

Tokuyama (H. Tokuyama et al., Effects of synthesis-solvent on swelling and elastic properties of poly(N-isopropylacrylamide) hydrogels, European Polymer Journal, 2007, 43, 4975-4982).*

* cited by examiner

*Primary Examiner* — Kumar R Bhushan
(74) *Attorney, Agent, or Firm* — Muncy, Geissler, Olds & Lowe

(57) ABSTRACT

Acrylamide-derived hydrogels and methods of fabrication thereof from an acrylic monomer, a crosslinking agent comprising an organosilicon compound, a polymerization initiator, a solvent and a polymerization accelerator, as well as their use in controlling circulation losses. The obtained hydrogels interact with the walls of the reservoir and exhibits an increase in viscosity, either at delayed times or in response to a given stimulus, such as changes in temperature, pressure, pH, salinity, using a simple and easily scalable methodology.

12 Claims, 2 Drawing Sheets

HYDROGELS DERIVED FROM ACRYLAMIDE FOR CONTROLLING CIRCULATION LOSSES AND METHODS OF FABRICATION THEREOF

BACKGROUND OF THE INVENTION

The present invention is related to the technical field of materials used for loss control in oil drilling operations. Specifically, the present invention relates to acrylamide-derived hydrogels and their use as control agents for circulation losses.

Hydrogels are macromolecular polymer gels constituted by crosslinked polymer networks and capable of reversibly absorbing large amounts of water, which allows their use in a variety of applications. The physicochemical characteristics of a hydrogel, as well as its possible applications, depend on its molecular structure, in particular the presence of functional groups and the degree of crosslinking, among others.

Several applications of hydrogels are described in the patent literature, particularly in biomedicine and in agriculture. For example, U.S. Pat. No. 6,066,172 A and EP 2 523 982 A1 describe the use of a hydrogel for the manufacture of a contact lens. In turn, applications in controlled drug release are known, as well as in controlled water release and soil structuring.

Hydrogels are also used in the treatment of underground formations, particularly in drilling and/or oil recovery operations. Hydrogels modify the rheological properties of drilling fluids and reduce the drawbacks associated with the decrease in their apparent viscosity of these fluids, in particular due to high operating temperatures. Additionally, the increase in apparent viscosity provided by hydrogels may be advantageous in fracturing operations, since fluids with higher viscosities will allow obtaining fractures with improved characteristics.

Patent application EP 0 583 814 A1 describes thermoviscosifying hydrogels for the oil industry, the structures of which comprise a polymeric skeleton with acrylic acid units, as well as thermosensitive polyethylene glycol grafts. US patent application 2015/027710 A1 describes poly (alkenyl amide)-polysaccharide hydrogels for use in the treatment of an underground formation. Application WO 2016/171683 A1 describes hydrogels obtained from cellulose with the incorporation of acrylamide and acrylic acid grafts or mixtures thereof for such use. The hydrogels described in these documents have certain disadvantages, such as excess water for washing the material (20 L for 25 g of product), long reaction times, as well as the possibility of microbial degradation of the polysaccharides.

There is therefore a need to provide a method for obtaining hydrogels that is easily reproducible and scalable, as well as hydrogels for use as control agents for circulation losses in oil drilling that have improved thermal sensitivity properties.

BRIEF SUMMARY OF THE INVENTION

The present patent application is aimed at obtaining a hydrogel capable of interacting with the walls of a reservoir and generating an increase in viscosity, either at delayed times (the swelling of the hydrogel occurs after 15 minutes) or as a response to given stimuli, such as changes in temperature, pressure, pH, salinity, using a simple methodology.

Contrary to the polymers of the prior art, the polymers disclosed herein are organic-inorganic hybrids, where the organic component comprises at least one acrylic monomer that grants the ability to form a hydrogel by crosslinking, and the inorganic component comprises at least one silylated compound, which provides greater interactions with a rock.

In a first aspect, an object of the present invention is a method to prepare a hydrogel, wherein the method comprises the steps of:

i. providing a solution comprising an acrylic monomer selected from acrylamide, methacrylamide, N-isopropylacrylamide, N-[tris(hydroxymethyl)methyl]acrylamide, N, N-diethylacrylamide, N,N-dimethylacrylamide, methacrylamidopropyltrimethylammonium chloride and mixtures thereof, a crosslinking agent comprising a organosilicon compound selected from divinyltetramethyldisiloxane, vinyltrimethoxysilane, methacryloxypropyltrimethoxysilane, trimethylsilyl acrylate, trichlorovinylsilane, trimethylsilyl methacrylate and mixtures thereof, a polymerization initiator and a solvent, ii. adding a polymerization accelerator to the solution, thereby obtaining a reacting mixture; and iii. polymerizing the reacting mixture.

In a preferred embodiment of the method of the present invention, the acrylic monomer is selected from acrylamide, N-isopropylacrylamide and mixtures thereof.

In a preferred embodiment of the method of the present invention, the crosslinking agent comprises divinyltetramethyldisiloxane. Even more preferably, the crosslinking agent further comprises N,N'-methylenebisacrylamide.

In a preferred embodiment of the method of the present invention, the monomer is acrylamide and the crosslinking agent is divinyltetramethyldisiloxane.

In another preferred embodiment of the method of the present invention, the monomer is N-isopropylacrylamide and the crosslinking agent is divinyltetramethyldisiloxane.

In a preferred embodiment of the method of the present invention, the monomer is acrylamide and the crosslinking agent is N,N'-methylenebisacrylamide.

In another preferred embodiment of the method of the present invention, the monomer is N-isopropylacrylamide and the crosslinking agent is N,N'-methylenebisacrylamide.

In a preferred embodiment of the method of the present invention, the solution comprises a mixture of acrylamide and N-isopropylacrylamide. Preferably, the molar ratio of acrylamide to N-isopropylacrylamide in the solution is between 1:4 and 4:1. Even more preferably, the molar ratio is 2:3.

In another preferred embodiment of the method of the present invention, the solution comprises a mixture of acrylamide and N-isopropylacrylamide and the crosslinking agent is divinyltetramethyldisiloxane.

In a preferred embodiment of the method of the present invention, the solution comprises a mixture of acrylamide and N-isopropylacrylamide and the crosslinking agent is a mixture of divinyltetramethyldisiloxane and N,N'-methylenebisacrylamide.

In another preferred embodiment of the method of the present invention, the solution comprises a mixture of acrylamide and N-isopropylacrylamide and the crosslinking agent comprises N,N'-methylenebisacrylamide.

In a preferred embodiment of the method of the present invention, the monomer is N-isopropylacrylamide and the crosslinking agent is a mixture of divinyltetramethyldisiloxane and N,N'-methylenebisacrylamide.

In another preferred embodiment of the method of the present invention, the solvent is selected from distilled water, methanol, ethanol, propanol, butanol and combinations thereof. Preferably, the solvent is methanol.

In a preferred embodiment of the method of the present invention, the polymerization initiator is selected from ammonium persulfate and sodium persulfate. Preferably, the polymerization initiator is ammonium persulfate.

In another preferred embodiment of the method of the present invention, the polymerization accelerator is N,N,N',N'-tetramethylethylenediamine.

In a preferred embodiment of the method of the present invention, at least one of the steps is carried out at room temperature.

In another preferred embodiment of the method of the present invention, at least one of the steps is carried out under nitrogen atmosphere.

In a preferred embodiment of the method of the present invention, the step iii) of polymerizing the reacting mixture is carried out for a time between 200 and 300 min.

In another preferred embodiment of the method of the present invention, at least one of the steps is carried out under stirring at 300 rpm.

In a preferred embodiment of the method of the present invention, the method further comprises the steps of purifying the hydrogel obtained from the polymerization of the reacting mixture.

In another preferred embodiment of the method of the present invention, the method further comprises the step of reacting the hydrogel with a solution comprising a second crosslinking agent selected from borax, chromium(III) acetate, silica nanoparticles and combinations thereof. Preferably, the mass ratio between the hydrogel and the second crosslinking agent is in the range between 1:10 and 10:1.

In a second aspect, an object of the present invention is a hydrogel obtained according to the method of the first aspect for use as a circulation loss control agent.

In a third aspect, an object of the present invention is a sealing composition comprising a hydrogel obtained according to the method of the first aspect and a granular or flaky material. Preferably, said granular or flaky material comprises fish scales.

In a fourth aspect, an object of the present invention is a hydrogel comprising a polymer of an acrylic monomer selected from acrylamide, methacrylamide, N-isopropylacrylamide, N-[tris(hydroxymethyl)methyl]acrylamide, N,N-diethylacrylamide, N,N-dimethylacrylamide, methacrylamidopropyltrimethylammonium chloride and mixtures thereof, crosslinked with a crosslinking agent comprising an organosilicon compound selected from divinyltetramethyldisiloxane, vinyltrimethoxysilane, methacryloxypropyltrimethoxysilane, trimethylsilyl acrylate, trichlorovinylsilane, trimethylsilyl methacrylate and mixtures thereof.

Preferably, the hydrogel comprises a polymer of acrylamide or a polymer of N-isopropylacrylamide or a copolymer thereof.

Preferably, the crosslinking agent comprises divinyltetramethyldisiloxane. Even more preferably, the crosslinking agent further comprises N,N'-methylenebisacrylamide.

In a preferred embodiment, the polymer is an acrylamide polymer and the crosslinking agent is divinyltetramethyldisiloxane.

In another preferred embodiment, the polymer is an N-isopropylacrylamide polymer and the crosslinking agent is divinyltetramethyldisiloxane.

In yet another preferred embodiment, the polymer is an acrylamide polymer and the crosslinking agent comprises N,N'-methylenebisacrylamide.

In a further preferred embodiment, the polymer is an N-isopropylacrylamide polymer and the crosslinking agent comprises N,N'-methylenebisacrylamide.

In a preferred embodiment, the polymer is a copolymer of N-isopropylacrylamide and acrylamide and the crosslinking agent is divinyltetramethyldisiloxane.

In another preferred embodiment, the polymer is a copolymer of N-isopropylacrylamide and acrylamide and the crosslinking agent comprises N,N'-methylenebisacrylamide.

In yet another preferred embodiment, the polymer is a copolymer of N-isopropylacrylamide and acrylamide and the crosslinking agent is a mixture of divinyltetramethyldisiloxane and N,N'-methylenebisacrylamide.

In a preferred embodiment, the hydrogel is further crosslinked with a second crosslinking agent selected from borax, chromium(III) acetate, silica nanoparticles and combinations thereof.

In a fifth aspect, an object of the present invention is sealing composition comprising the hydrogel of the fourth aspect and a granular or flaky material. Preferably, said granular or flaky material comprises fish scales.

DETAILED DESCRIPTION

Figure 1:
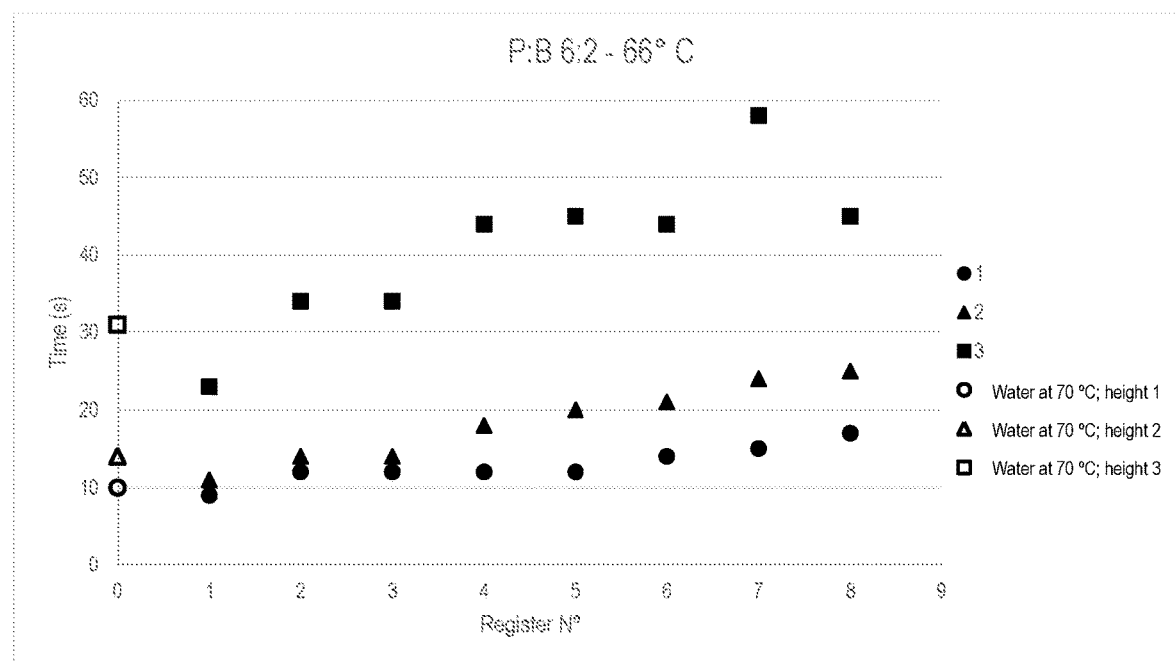
FIG. 1 shows the elution times recorded for three different water column heights, for a hydrogel according to the present invention. Filled markers correspond to the NIPA:AAM+DVTMDSi 60:40 mixture, at 6% w/w+2% w/w borax at 66° C. The unfilled markers correspond to times recorded for the column without the mixture, only with $H_2O$ at 70° C.

The invention will be described in further detail below with reference to the accompanying drawings.

As used herein, the term "room temperature" refers to a temperature generally comprised between 15° C. and 28° C.

The polymerization mechanism of one or several monomers and their conversion into a polymer generally comprises stages of initiation, propagation (polymer chain growth) and termination. In the context of the present invention, the polymerization mechanism is a free radical mechanism.

As used herein, the term "free radical" refers to a chemical species that has at least one unpaired electron. Free radicals can be generated within the polymerization system by thermal decomposition of the monomer (thermal initiation) or by using a polymerization initiator (chemical initiation).

The term "polymerization initiator" refers to a chemical species whose decomposition generates a free radical. In general, the initiators have thermolabile functional groups, for example, peroxide groups or azo groups.

As used herein, the term "crosslinking agent" refers to a chemical species capable of bonding polymer chains by covalent or ionic bonds via crosslinking reactions.

The term "sealing capacity" is used to specify a characteristic of hydrogels and compositions that allow the sealing of fissures or similar structures in the formation and that prevent or hinder the passage of fluids towards them, thereby reducing circulation losses.

The method of the present invention allows obtaining strong hydrogels, with sealing capacity and capable of generating an effective seal in formations that have high or total leakoffs. Such hydrogels are sensitive to changes in pH, temperature, salinity, changes in pressure or time and are optimal for use as control agents for severe losses of circulation fluids during drilling operations.

Temperature sensitivity is related to the critical temperature parameter Lower Critical Solution Temperature (LOST). The hydrogels of the present invention have LOST values close to the usual working temperatures in a perforation, making them advantageous for such applications.

The hydrogels of the present invention can be placed in the underground formation in the form of a pill, their hydration and swelling is produced by contact with water therein. Alternatively, the hydrogels can be included as part of the drilling fluid and their swelling can be controlled. The triggers of the swelling process can be changes in temperature, time, pH or salinity of the medium.

In addition, the hydrogels are compatible with both oil-based and water-based sludges, as well as with different commercially available sealing materials.

EXAMPLES

System 1: Acrylamide (AAM)+Divinyltetramethyldisiloxane (DVTMDSi):

The synthesis consisted of the polymerization of acrylamide (AAM) in the presence of a silylated crosslinking agent, divinyltetramethyldisiloxane (DVTMDSi) in a 27:1 molar ratio. The reaction was carried out in a plastic container to avoid adhesion of the silylated component to glass, under nitrogen atmosphere and mechanical agitation. The initiator was ammonium persulfate (APS), and N,N,N',N'-tetramethylethylenediamine (TEMED) was used as an accelerator.

The monomer, crosslinking agent and initiator along with methanol were added to the reactor under stirring. After dissolution, the accelerator was added, thereby starting the reaction. After 2 h 30 min of reaction at room temperature in a glycerin bath, the reaction solvent was filtered and the solid was washed with the same solvent. The solid was placed for evaporation under reduced pressure to remove the remaining solvent. The resulting white solid was placed in a water bath for 48 h and the hydrated material was subsequently lyophilized until complete water extraction.

System 2: N-Isopropylacrylamide (NIPA)+Divinyltetramethyldisiloxane (DVTMDSi):

In a plastic container, to avoid adhesion of the silylated component to the glass, the monomer (NIPA) and the crosslinker (DVTMDSi) in methanol (MeOH) were placed, at a NIPA:DVTMDSi 28.2:1 molar ratio. The system was heated to 40° C., under mechanical stirring at 300 rpm and nitrogen circulation. In parallel, a suitable amount of the reaction initiator, ammonium persulfate (APS; molar ratio NIPA:APS of 126:1), was dissolved by heating and sonication of the solution in the minimum necessary quantities of methanol and distilled water (3 and 0.5 mL respectively). The initiator solution was added with syringe to the system. Final molar ratios for MeOH:NIPA and NIPA:$H_2O$ were 17.4:1 and 1.4:1, respectively. The reaction was initiated by the addition of an adequate amount of the accelerator, N,N,N',N'-tetramethylethylenediamine (TEMED), with a NIPA: TEMED molar ratio of 8.5:1. The reaction proceeded at 40° C. for 2 hours and 40 minutes, under a nitrogen stream and stirring. After completion of the reaction, the medium was dried by solvent evaporation under reduced pressure. The resulting solid residue was purified by dissolving in water at room temperature and heating the solution for total precipitation of the product, which was separated by hot filtration. The obtained solid was dried in a vacuum oven at 40° C.

System 3: N-Isopropylacrylamide (NIPA)+Acrylamide (AAM)+Divinyltetramethyldisiloxane (DVTMDSi):

In a plastic container, to avoid adhesion of the silylated component to the glass, the NIPA and AAM monomers and the DVTMDSi crosslinker were weighed and dissolved in methanol (MeOH), which was previously purged by nitrogen bubbling. The molar ratios between the monomers and the total amount of monomer (Mtotal=NIPA+AAM) and DVTMDSi that were used in the embodiments of System 3 of the present invention are shown in Table 1. The system was heated to 40° C., under mechanical agitation at 300 rpm and nitrogen circulation. In parallel, a corresponding amount of reaction initiator, ammonium persulfate (APS; molar ratios Mtotal:APS as shown in Table 1), was dissolved by heating and sonication of the solution in the minimum necessary quantities of methanol and distilled water (3 and 0.5 mL respectively). The initiator solution was added with a syringe to the system (final molar ratios MeOH:Mtotal and Mtotal:$H_2O$ as shown in table 1). The reaction was initiated by adding an adequate amount of accelerator, N,N,N',N'-tetramethylethylenediamine (TEMED; Mtotal:TEMED molar ratio as shown in table 1). The reaction proceeded at 40° C. under a stream of nitrogen and stirring. The reaction times are shown in Table 1. Depending on the NIPA:AAM ratio, a homogeneous solution was obtained or a gel was formed in the reaction medium. After completion of the reaction, the medium was dried by solvent evaporation under reduced pressure. The resulting solid residue was purified in water by hot recrystallization (i.e. dissolving the solid at room temperature, heating the solution for total precipitation of the product, followed by hot filtration), for the NIPA:AAM ratio of 80:20, or by solvent washing such as acetone for the NIPA:AAM ratios of 60:40 and 40:60, or ethanol for the NIPA: AAM ratio of 20:80. The obtained solids were dried in a vacuum oven at 40° C. In the cases in which the obtained polymers gelled in $H_2O$, they were immersed in water for 24 hours. The resulting gels were frozen and lyophilized to obtain the corresponding xerogels.

TABLE 1

Molar ratios and reaction times used in the examples for the system NIPA:AAM + DVTMDSi.

| Example | 3.1 NIPA:AAM 80:20 | 3.2 NIPA:AAM 60:40 | 3.3 NIPA:AAM 40:60 | 3.4 NIPA:AAM 20:80 |
|---|---|---|---|---|
| Ratio [NIPA]:[AAM] | 3.74 | 1.50 | 0.67 | 0.25 |
| Ratio [Mtotal]:[DVTMDSi] | 28.4 | 28.3 | 28.1 | 29.3 |

TABLE 1-continued

Molar ratios and reaction times used in the examples for the system NIPA:AAM + DVTMDSi.

| Example | 3.1<br>NIPA:AAM 80:20 | 3.2<br>NIPA:AAM 60:40 | 3.3<br>NIPA:AAM 40:60 | 3.4<br>NIPA:AAM 20:80 |
|---|---|---|---|---|
| Ratio [Mtotal]:[APS] | 128 | 126 | 127 | 132 |
| Ratio [MeOH]:[Mtotal] | 16.5 | 16.6 | 16.4 | 15.7 |
| Ratio [Mtotal]:[H$_2$O] | 1.27 | 1.67 | 1.82 | 2.01 |
| Ratio [Mtotal]:[TEMED] | 8.8 | 8.6 | 8.4 | 8.8 |
| Reaction time (h) | 4:30 | 4:35 | 3:15 | 4:00 |

System 4: N-Isopropylacrylamide (NIPA)+Acrylamide (AAM)+Divinyltetramethyldisiloxane (DVTMDSi)+N,N'-MethyleneN,N'-Methylenebisacrylamide (BIS):

In a plastic container, to avoid adhesion of the silylated component to the glass, the NIPA and AAM monomers and the crosslinkers DVTMDSi and BIS were weighed and dissolved in methanol (MeOH), which was previously purged by nitrogen or argon bubbling, depending on the case. The molar ratios between the monomers and the total amount of monomer (Mtotal=NIPA+AAM) and the total amount of crosslinking agent (Etotal=DVTMDSi+BIS) that were used in the embodiments of System 4 of the present invention are shown in Table 2. The system was heated to 40° C., under mechanical agitation at 300 rpm and nitrogen circulation. In parallel, a corresponding amount of reaction initiator, ammonium persulfate (APS; molar ratios Mtotal:APS as shown in Table 2), was dissolved by heating and sonication of the solution in the minimum necessary quantities of methanol and distilled water (3 and 0.5 mL respectively). The initiator solution was added with a syringe to the system (final molar ratios MeOH:Mtotal and Mtotal:H$_2$O as shown in Table 2). The reaction was initiated by adding an adequate amount of accelerator, N,N,N',N'-tetramethylethylenediamine (TEMED; Mtotal:TEMED molar ratio as shown in Table 2). The reaction proceeded at 40° C. under a stream of nitrogen and stirring. The reaction times are shown in Table 2. After completion of the reaction, the medium was dried by solvent evaporation under reduced pressure. The resulting solid residue was purified in water by hot recrystallization (i.e. dissolving the solid at room temperature, heating the solution for total precipitation of the product, followed by hot filtration), for the NIPA:AAM ratio of 80:20, or by solvent washing such as acetone for the NIPA:AAM ratio 60:40. The obtained solids were dried in a vacuum oven at 40° C.

System 5: Systems 1-4+Borax/Chromium(III) Acetate/Silica Nanoparticles:

Various materials were prepared from the polymers obtained in Systems 1 to 4 and using borax, chromium(III) acetate or Ludox® nanosized colloidal silica as a second crosslinking agent. In particular, those polymers that, instead of gelling, were soluble in H$_2$O at room temperature, were used in this preparation. Aqueous solutions of the polymers and crosslinking agents were prepared, which were then mixed in the following order: polymer solution, distilled H$_2$O, crosslinking agent solution. Once the mixture was prepared, the system was homogenized by stirring with a vortex agitator for approximately 10 seconds. Table 3 shows the mass ratios used in the preferred embodiments of mixtures corresponding to System 5.

TABLE 2

Mass ratios used in the examples for the polymer + second crosslinking agent of System 5

| Example | Polymer | Crosslinking agent | Mass ratio |
|---|---|---|---|
| 1 | NIPA:AAM 60:40 | Ludox ® | 5.92 |
| 2 | NIPA:AAM 60:40 | Ludox ® | 4.01 |
| 3 | NIPA:AAM 60:40 | Ludox ® | 2.01 |
| 4 | NIPA:AAM 60:40 | Ludox ® | 1.98 |
| 5 | NIPA:AAM 60:40 | Ludox ® | 1.00 |
| 6 | NIPA:AAM 60:40 | Ludox ® | 0.67 |
| 7 | NIPA:AAM 60:40 | Ludox ® | 0.50 |
| 8 | NIPA:AAM 60:40 | Ludox ® | 0.33 |
| 9 | NIPA:AAM 60:40 | Borax | 0.51 |
| 10 | NIPA:AAM 60:40 | Borax | 1.01 |
| 11 | NIPA:AAM 60:40 | Borax | 1.95 |
| 12 | NIPA:AAM 60:40 | Borax | 3.01 |
| 13 | NIPA:AAM 60:40 | Borax | 4.00 |
| 14 | NIPA:AAM 60:40 | Borax | 6.00 |
| 15 | NIPA:AAM 60:40 | Borax | 7.92 |
| 16 | NIPA:AAM 60:40 | Chromium(III) acetate | 1.92 |
| 17 | NIPA:AAM 60:40 | Chromium(III) acetate | 7.00 |
| 18 | NIPA:AAM 60:40 | Chromium(III) acetate | 10.00 |

TABLE 2

Molar ratios and reaction times used in the examples for the system NIPA:AAM + DVTMDSi:BIS.

| Example | 4.1<br>NIPA:AAM 80:20<br>DVTMDSi:BIS 9:1 | 4.2<br>NIPA:AAM 60:40<br>DVTMDSi:BIS 2:1 | 4.3<br>NIPA:AAM 80:20<br>DVTMDSi:BIS 2:1 |
|---|---|---|---|
| Ratio [NIPA]:[AAM] | 3.97 | 1.50 | 3.99 |
| Ratio [DVTMDSi]:[BIS] | 8.60 | 2.02 | 2.00 |
| Ratio [Mtotal]:[Etotal] | 28.2 | 18.7 | 18.68 |
| Ratio [Mtotal]:[APS] | 126 | 125 | 124 |
| Ratio [MeOH]:[Mtotal] | 16.5 | 29.9 | 29.9 |
| Ratio [Mtotal]:[H$_2$O] | 1.70 | 0.92 | 0.85 |
| Ratio [Mtotal]:[TEMED] | 8.85 | 8.54 | 8.84 |
| Reaction time (h) | 4:00 | 4:00 | 4:00 |

Results
Performance Tests:

Table 4 summarizes the results obtained in the performance tests for System 1 (AAM+DVTMDSi). In all cases, a disk with a 6 mm slot was used in a filtering cell. The system to be evaluated is loaded into the cell and a certain pressure is applied for a certain time. Then, the lower valve of the cell is opened and the volume of filtered liquid is registered. Finally, 350 mL of sludge are loaded and the filtered volumes for 30 minutes for different applied pressures are registered. System 1 was evaluated mixed small fish scales, from hake or tilapia, with an average size of 2 to 7 mm, as a sealing enhancement agent.

In the first test of System 1 with small fish scales, 300 PSI were applied for 15 minutes before opening the valve, after which 45 mL filtered for the first 2 seconds. Once sludge was added, the volumes collected for each applied pressure, shown in Table 3, were obtained during the first seconds. For the remainder of the 30 minutes, sludge did not filter in any case. For pressures from 500 PSI, the filtered volume consisted of water. Upon opening the cell, scales were observed on the mesh with gel crystals. Gel was also observed in the slot and in the space comprised between the slot and the casing. The crystals were swollen (hydrated).

In the second test of System 1 with small fish scales, 100 PSI were applied for 15 minutes before opening the valve, after which 50 mL filtered for the first 2 seconds. Once sludge was added, the volumes collected for each applied pressure, shown in Table 4, were obtained during the first seconds. For the remainder of the 30 minutes, sludge did not filter in any case. Upon opening the cell, scales were observed on the mesh with gel crystals. Gel was also observed in the slot and in the space comprised between the slot and the casing. The crystals were swollen (hydrated).

The performance of the small fish scales was also tested in the absence of the hydrogel, i.e. without System 1. In this case, the scales passed through the slot fissure, so they covered the mesh. Similar results were obtained with anchovy scales, which have an average size of 5 to 7 mm. The only difference was that they were retained on the slot and in the fissure.

TABLE 4

Filtered volumes registered during performance tests

| Pressure (PSI) | Filtered volume (mL) | | |
|---|---|---|---|
| | System 1 (4%) + small scales (2%) | | Small scales (100%) |
| | Test 1 | Test 2 | |
| 100 | — | 15 | 79 (1'50") |
| 300 | 5 | 4 | 6 |
| 500 | 3 | 1 | 0 |
| 700 | 2 | 1 | 0 |
| 1000 | 1 | 0.5 | 0 |

Figure 2:
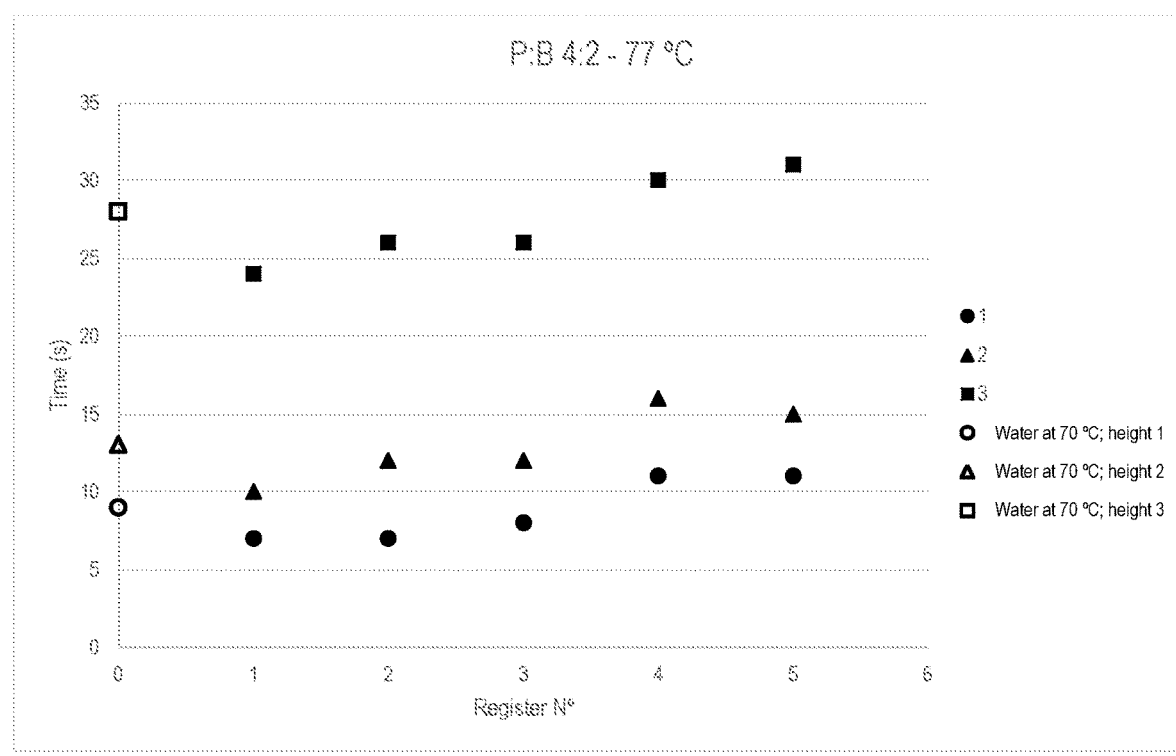
FIG. 2 shows the elution times recorded for three different water column heights, for a hydrogel according to the present invention. Filled markers correspond to the NIPA:AAM+DVTMDSi 60:40 mixture, at 4% w/w+2% w/w borax at 77° C. The unfilled markers correspond to times recorded for the column without the mixture, only with $H_2O$ at 70° C.

Sealing Tests:
System 4 (NIPA:AAM+DVTMDSi+Borax):

To determine the sealing capacity of mixtures of the NIPA:AAM 60:40 polymer+DVTMDSi with borax, water circulation tests through a sand column were carried out, both in the absence and in the presence of the mixture to be tested. Since borax mixtures gel above the critical temperature (LCST), these tests had to be carried out at controlled temperatures and above room temperature. Therefore, a jacketed column was used, achieving system thermostatization by means of hot water recirculated through the column using a pump. Control of the recirculated water temperature was achieved using a heating blanket with a thermocouple. In all cases, the internal diameter of the column was 1 cm, and the height of the sand column was 3 cm. To determine if the tested mixture seals the system, the elution time of 10 drops or of 1 mL volume, for three different water column heights $h_1$, $h_2$ and $h_3$ is registered. The obtained results for some of these tests are shown in Tables 5 and 6, and in FIGS. 1 and 2, where $t_{hn}$ corresponds to the elution time of 10 drops for each water column height, $h_n$ with n=1, 2 or 3.

TABLE 5

Required elution times for 10 drops from the experimental setup, loaded with 1.3 mL of mixture and for water without mixture.

| Blank | Register | | | | | |
|---|---|---|---|---|---|---|
| | [P]:[B] 6:2 | | | [P]:[B] 4:2 | | |
| (Water at 70° C) | $t_{h1}$ (s) | $t_{h2}$ (s) | $t_{h3}$ (s) | $t_{h1}$ (s) | $t_{h2}$ (s) | $t_{h3}$ (s) |
| | 10 | 14 | 31 | 9 | 13 | 28 |
| 1 | 9 | 11 | 23 | 7 | 10 | 24 |
| 2 | 12 | 14 | 34 | 7 | 12 | 26 |
| 3 | 12 | 14 | 34 | 8 | 12 | 26 |
| 4 | 12 | 18 | 44 | 11 | 16 | 30 |
| 5 | 12 | 20 | 45 | 11 | 15 | 31 |
| 6 | 14 | 21 | 44 | — | — | — |
| 7 | 15 | 24 | 58 | — | — | — |
| 8 | 17 | 25 | 45 | — | — | — |

P = NIPA:AAM + DVTMDSi 60:40;
B = Borax

Concentrations in Table 5 are indicated in % w/w. For the same water column height, a longer time corresponds to a higher sealing degree. In both cases, the mixture was allowed to gel inside the column for 10 minutes, before opening it to begin elution. In the case of the 6:2 mixture, the working temperature was 66° C., while with the 4:2 mixture the working temperature was 77° C. The blank corresponds to the system loaded only with water at 70° C., that is, without the polymer+borax mixture. Elution times recorded throughout the measurement for different sets of 10 drops are indicated using numerals from 1 to 8, according to their chronological order

TABLE 6

Elution time for 1 mL

| System | $t_1$ mL (s) |
|---|---|
| $H_2O$ | 10 |
| [P]:[B] 4:2 | >600 |

Table 6 shows the times required for the elution of a volume of 1 mL from the experimental setup, loaded with 5 mL of mixture, for a water column height $h_1$. P=NIPA:AAM+DVTMDSi 60:40; B=Borax. The concentrations are indicated in % w/w. A longer time corresponds to a higher sealing degree. The test was carried out at 77°, and the mixture was allowed to gel inside the column for 1 hour, before opening it to begin elution.

Based on the results obtained, the mixtures of the NIPA:AAM polymer 60:40+DVTMDSi with borax have a good sealing capacity above their LCST. This capacity depends on the conditions tested, increasing significantly by employing a greater amount of mixture and allowing the gel to develop for an hour. In addition, these systems are heat-reversible, recovering circulation through the column by cooling the system below the LOST.

Temperature Response
System 3 (NIPA:AAM+DVTMDSi):

Polymers obtained from this system display a response to changes in temperature. Starting from the LOST, they present a conformational change that results, in the cases in which the polymers were soluble in water, in their precipitation. In these cases, its LOST was determined by dissolving a small amount of polymer in approximately 1 mL of $H_2O$ (d) inside a test tube. The tube with solution was heated in a water bath, increasing the temperature in a controlled way by one degree centigrade at a time, using a heating blanket with a thermocouple, until observing the appearance of turbidity in the tube. The determined LOST values are shown in Table 7.

TABLE 7

Critical temperatures for polymers corresponding to the NIPA:AAM + DVTMDSi system.

| Polymer NIPA:AAM | Forms gel? | LCST (° C.) |
|---|---|---|
| 80:20 | No | 45 |
| 60:40 | No | 66 |
| 40:60 | No | >100 |
| 20:80 | Yes | NM |

NM: not measured

From these results, it is observed that the response to temperature depends on the NIPA:AAM ratio in the polymer composition. The higher the AAM content (or the lower NIPA content), the LOST increases.

System 5 (NIPA:AAM+DVTMDSi+Borax/Chromium(III) Acetate/Ludox®):

In these embodiments, for mixtures with borax or with chromium(III) acetate, the temperature response results in gelation when the system is heated above the LOST. For mixtures with Ludox®, the system gels both below and above the LOST, but its consistency and properties change.

In these cases, its LOST was determined by loading 1 to 5 mL of mixture into a test tube or a vial. The tubes/vials containing the mixtures were heated in a water bath, increasing the temperature in a controlled way by one degree centigrade at a time, using a heating blanket with a thermocouple, until a change in the consistency of the mixture was observed. Tables 8 and 9 show the values for the LCSTs determined in each case. As these changes were not as drastic as for System 3, it was possible to determine temperature ranges using this methodology. It should also be clarified the rheological tests showed no observable differences between the LCSTs of the polymers of System 3 and those of their mixtures (System 5), for the cases tested (for example, for the mixture of NIPA:AAM 60:40 polymer+6% w/w DVTMDSi with 2% w/w borax, the appearance of turbidity was observed from 57-59° C.; however, the change in the viscosity of the mixture in rheological tests was produced only at 65-69° C., that is to say at the LOST of the NIPA polymer NIPA:AAM 60:40 polymer+pure DVTMDSi Hydration Times:

A visual hydration test for System 1 was carried out, with a 5% w/w mixture of the solid in water. At t=0 suspended particles are observed. After 15 minutes, no free water separating from the solid mass is observed. Therefore, the necessary time to reach a degree of swelling suitable for the desired purpose is of approximately 15 min.

The experimental results allow concluding that the hydrogels of the present invention can be obtained with a simple and easily scalable method of synthesis. The hydrogels have a sealing capacity that allows their use as a control agent for circulation losses in perforations, for example as an ingredient of a sealant composition comprising other agents having sealing enhancing capacity, such as fish scales.

TABLE 8

LCSTs determined through visual inspection of the mixtures corresponding to the system NIPA:AAM 60:40 + DVTMDSi with Ludox ®.

| Crosslinking agent | [Polymer] (% p/p) | [Crosslinking agent] (% p/p) | Ratio [P]:[E] | LCST (° C.) |
|---|---|---|---|---|
| Ludox ® | 8.98 | 1.52 | 6/1 | 66-67 |
| | 5.00 | 1.25 | 4/1 | 66-67 |
| | 2.51 | 1.25 | 2/1 | 60-70 |
| | 4.98 | 2.51 | 2/1 | — |
| | 2.51 | 2.50 | 1/1 | 70-75 |
| | 5.01 | 5.01 | 1/1 | 60-70 |
| | 5.00 | 7.48 | 2/3 | 74-75 |
| | 2.51 | 5.01 | 1/2 | 75-80 |
| | 2.50 | 7.51 | 1/3 | — |

TABLE 9

LCSTs determined through visual inspection of the mixtures corresponding to the system NIPA:AAM 60:40 + DVTMDSi with borax or chromium(III) acetate

| Crosslinking agent | [Polymer] (% p/p) | [Crosslinking agent] (% p/p) | Ratio [P]:[E] | LCST (° C.) |
|---|---|---|---|---|
| Borax | 2.02 | 3.99 | 1/2 | 50-55 |
| | 2.99 | 2.96 | 1/1 | 50-55 |
| | 3.94 | 2.02 | 2/1 | 55-58 |
| | 6.01 | 2.00 | 3/1 | 57-59 |
| | 3.91 | 1.08 | 4/1 | 62-64 |
| | 5.89 | 1.00 | 6/1 | 60-62 |
| | 7.98 | 1.01 | 8/1 | 59-62 |
| Cr (III) acetate | 5.03 | 2.61 | 2/1 | 60-65 |
| | 1.80 | 0.26 | 7/1 | 65-70 |
| | 6.46 | 0.66 | 10/1 | 65-70 |

The invention claimed is:

1. A method to prepare a hydrogel, wherein the method comprises the steps of:
   i. providing a solution comprising an acrylic monomer selected from acrylamide, methacrylamide, N-isopropylacrylamide, N-[tris(hydroxymethyl)methyl] acrylamide, N,N-diethylacrylamide, N,N-dimethylacrylamide, methacrylamidopropyltrimethylammonium chloride and mixtures thereof, divinyltetramethyldisiloxane as crosslinking agent, a polymerization initiator and methanol as solvent, wherein a molar ratio of acrylic monomer to divinyltetramethyldisiloxane is from about 27:1 to about 29:1,
   ii. adding a polymerization accelerator to the solution, thereby obtaining a reacting mixture; and
   iii. polymerizing the reacting mixture.

2. The method according to claim 1, wherein the monomer is acrylamide.

3. The method according to claim 1, wherein the monomer is N-isopropylacrylamide.

4. The method according to claim 1, wherein the monomer is acrylamide and the solution further comprises N,N'-methylenebisacrylamide.

5. The method according to claim 1, wherein the monomer is N-isopropylacrylamide and the solution further comprises N,N'-methylenebisacrylamide.

6. The method according to claim 1, wherein the polymerization initiator is ammonium persulfate and sodium persulfate.

7. The method according to claim 1, wherein the polymerization accelerator is N,N,N' ,N' -tetramethylethylenediamine.

8. The method according to claim 1, wherein at least one of the steps is carried out at room temperature.

9. The method according to claim 1, wherein at least one of the steps is carried out under nitrogen atmosphere.

10. The method according to claim 1, wherein at least one of the steps is carried out under stirring at 300 rpm.

11. The method according to claim 1, wherein the method further comprises the steps of purifying the hydrogel obtained from the polymerization of the reacting mixture.

12. The method according to claim 1, wherein the method further comprises the step of reacting the polymer with a solution comprising a second crosslinking agent selected from the group consisting of borax, chromium(III) acetate, silica nanoparticles and combinations thereof.

* * * * *